United States Patent
Venkatesh (10) Patent No.: US 8,879,527 B1
(45) Date of Patent: Nov. 4, 2014

(54) ACCESS POINT PROCESSOR FOR A WIRELESS LOCAL AREA NETWORK UTILIZING MULTIPLE SUB-CHANNELS

(75) Inventor: Narasimhan Venkatesh, Hyderabad (IN)

(73) Assignee: Redpine Signals, Inc., San Jose, CA (US)

(*) Notice: Subject to any disclaimer, the term of this patent is extended or adjusted under 35 U.S.C. 154(b) by 106 days.

(21) Appl. No.: 13/278,436

(22) Filed: Oct. 21, 2011

Related U.S. Application Data (60) Provisional application No. 61/405,206, filed on Oct. 21, 2010.

(51) Int. Cl.
*H04W 4/00* (2009.01)

(52) U.S. Cl.
CPC .................... *H04W 4/00* (2013.01)
USPC .......................................... 370/338

(58) Field of Classification Search
CPC .................... H04J 3/22; H04W 4/00
USPC .......................................... 370/338
See application file for complete search history.

(56) References Cited

U.S. PATENT DOCUMENTS

| | | | |
|---|---|---|---|
| 2008/0163024 A1* | 7/2008 | Lakkis | 714/752 |
| 2009/0323646 A1* | 12/2009 | Ketchum et al. | 370/338 |
| 2011/0188484 A1* | 8/2011 | Reznik et al. | 370/338 |

* cited by examiner

*Primary Examiner* — Dang Ton
*Assistant Examiner* — Nourali Mansoury
(74) *Attorney, Agent, or Firm* — File-EE-Patents.com; Jay A. Chesavage (57) ABSTRACT

A channel access processor for an access point operates in a frequency spectrum which is divided into master channels, each master channel further having a plurality of sub-channels, each sub-channel capable of supporting wireless LAN communications independently from any other said sub-channel of the master channel. Each master channel is thereby associated with a plurality of sub-channels, and the sub-channels each have an associated bandpass filter and mixer frequency specific to that sub-channel, thereby allowing a plurality of independent wireless communications sessions to simultaneously take place over the multiple sub-channels of the master channel of the access point.

18 Claims, 7 Drawing Sheets

*Figure 1*
Distributed Access Points in Stadium
Prior Art

*Figure 2*
WLAN IEEE Channels & subcarriers
Prior Art

Figure 3

STA selects strongest AP of {AP1, AP2, AP8, AP11}

STA Associates with AP1

Figure 4
Dense Access Point Distribution with AP Sub-Channel Assignment

Figure 5
WLAN IEEE Channels & subcarriers

*Figure 9*
2D array configuration

Figure 10
Channel Access point (5 sub-channels)

*Figure 12*
Bandpass Filter Characteristic

ACCESS POINT PROCESSOR FOR A WIRELESS LOCAL AREA NETWORK UTILIZING MULTIPLE SUB-CHANNELS

The present patent application claims priority of provisional patent application 61/405,206 filed Oct. 21, 2010.

FIELD OF THE INVENTION

The present invention relates to the utilization of a wireless local area network (WLAN) channel. In particular, it relates to the signal processing for the utilization and assignment of WLAN channels to wireless stations in dense user environments such as stadiums and other high wireless user-density situations.

BACKGROUND OF THE INVENTION

Figure 1:
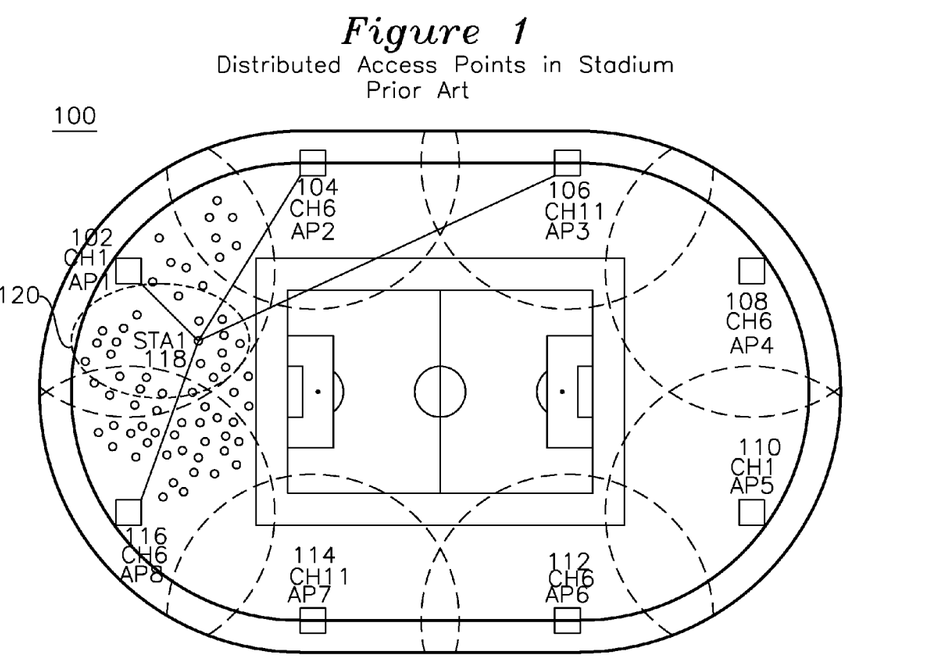
FIG. 1 shows a diagram of a sports stadium with a plurality of access points and a distribution of wireless stations.
Figure 2:
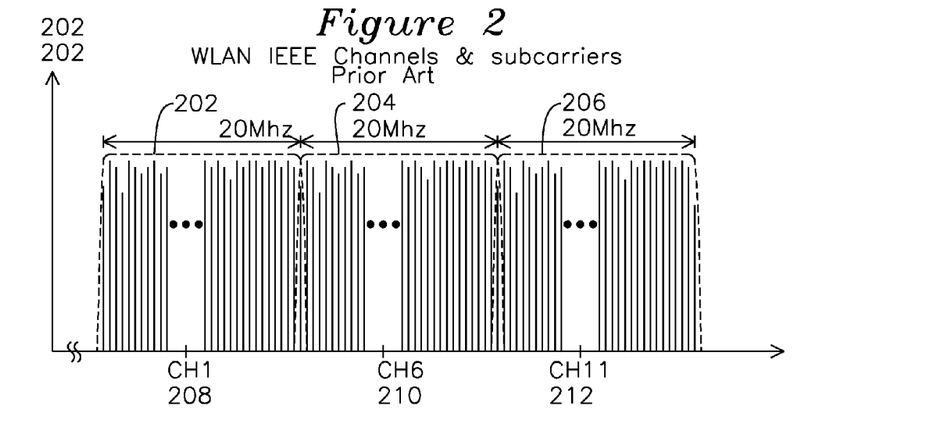
FIG. 2 shows a plot of WLAN OFDM subcarriers grouped to form separate communication channels.
Figure 3:
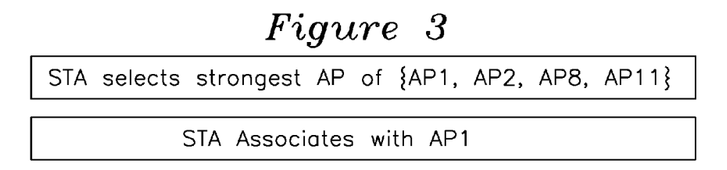
FIG. 3 shows a flowchart for MAC layer association.

FIG. 1 shows the diagram of a prior art distributed access point deployment, such as a sports stadium. Many wireless users may congregate in the stadium, and enhance their sport viewing experience using portable wireless devices which include a WLAN capability. In the prior art, a plurality of access points AP1 102, AP2 104, AP3 106, AP4 108, AP5 110, AP6 112, AP7 114, AP8 116 are placed around the perimeter of the stadium, or in any manner which provides adequate WLAN coverage over the stadium. FIG. 2 shows the prior art utilization of a segment of the wireless spectrum, and a common division of the wireless spectrum according to IEEE 802.11 "IEEE channel numberings", where each IEEE channel number is associated with a particular channel center frequency. For clarity, "IEEE Channel" is used to indicate the prior art 802.11a/b/g WLAN channel where 802.11a/b/g indicates any of the well known wireless protocols described in IEEE standards 802.11a, 802.11b, or 802.11g. FIG. 2 shows IEEE channel 1 208 which contains 64 or 128 subcarriers of OFDM modulation data, and IEEE channel 6 210 and IEEE channel 11 212 are similarly configured. WLAN communications systems which operate according to IEEE wireless standards 802.11a/b/g operate with each station (STA) associated with a particular access point (AP), such that a plurality of stations may use an access point which is operative in CH1, a different plurality of stations may use an access point which is operative in CH6, and yet another plurality of stations may use an access point operative in CH 11. As shared media operating under the IEEE 802.11a/b/g WLAN standards, the simultaneous transmission by an access point and station on the same IEEE channel is known as a collision, and the AP and STA will re-transmit the packet when the recipient of the corrupted packet fails to acknowledge receipt by detecting the missing MAC layer sequence number of the corrupted packet in the received packet stream. When two access points (AP) attempt to equally share a IEEE channel such as IEEE channel CH1, a likelihood exists that both access points will transmit at the same instant in time, which will result in superposition of the subcarriers from each AP and the receiving STA will simply see a corrupted OFDM symbol. For this reason, the access points operate in separate channels, such as the example shown in FIG. 1, where configuration of the access points AP1 through AP8 is done to maximize the distance between two access points using the same channel, such as AP1 102 and AP5 110. In the prior art, a station such as STA1 can select a strongest AP such as AP1 102 without concern for residual interference from distant AP5 110 which is operative on the same channel, but generates greatly attenuated subcarriers compared to AP1 102.

A problem occurs where a large plurality of users 120 are located in a single access point region, and this problem is exacerbated when all of these users have a large amount of data to transmit or receive. In this case, the particular IEEE channel CH1 is shared by a large number of users who overwhelm the capacity of the channel, and quality of service to all users in that particular quadrant is degraded. It is desired to provide an improved quality of service for a cluster of high density WLAN users.

OBJECTS OF THE INVENTION

A first object of this invention is a signal processor for a master channel having a plurality of sub-channels, each sub-channel operative on a plurality of subcarriers which are distinct from the subcarriers of any other sub-channel within the master channel.

A second object of the invention is a signal processor having substantially identical signal processing for a plurality of sub-channels forming a master channel, each of the sub-channels having a unique bandpass filter and associated mixer frequency for baseband demodulation and modulation of the subcarriers within a particular sub-channel.

SUMMARY OF THE INVENTION

A wireless spectrum is divided into a plurality of master channels, each master channel operative on a particular AP and each master channel comprising a plurality of unique sub-channels, each sub-channel comprising a plurality of subcarriers which together are suitable for use as a communications channel operative with a communications protocol such as IEEE 802.11a/b/g. In a high density user environment, an access point (AP) simultaneously transmits and receives on several such sub-channels, and each access points exerts control over how many stations may associated, such as by selective IEEE Standard 802.11 Service Set IDentifier (SSID) advertisement, or other means, thereby allowing a particular STA to select one of a plurality of available sub-channels with equivalent signal strength for MAC layer association. An access point signal processor has a plurality of sub-channel processors, each sub-channel processor operative on a unique sub-channel frequency band which includes subcarriers for the communications sub-channel operative using 802.11a/b/g. Each sub-channel processor has a unique bandpass filter coupled to the antenna of the sub-channel processor and also an associated mixer frequency for transmit and receive processing.

DETAILED DESCRIPTION OF THE INVENTION

Figure 4:
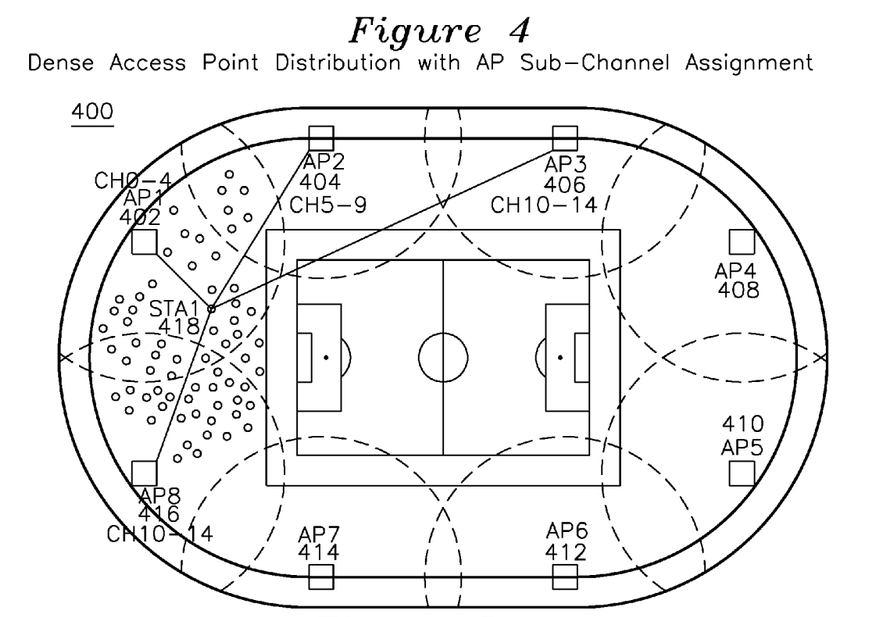
FIG. 4 shows a diagram of the topology of a dense access point distribution with sub-channel assignments.

FIG. 4 shows a dense access point distribution with sub-channel assignments, which could be done statically by a network user based on AP layout topology, or dynamically or automatically by each AP based on sub-channel selection based on minimum signal level (indicating maximum distance separation) from adjacent APs. In the prior art, a single access point 102 of FIG. 1 would be operative on a single IEEE channel, and the different IEEE channels would be used by the adjacent access points to avoid superposition of sub-carriers. For example, as shown in FIG. 2, one access point would use IEEE channel 1 with subcarriers 202 with non-interfering subcarriers 204, or it could use IEEE channel 11 with non-interfering subcarriers 206. In FIG. 4, each access point is operative on a "master channel", which consists of a plurality of non-interfering "sub-channels" which are distinct from any sub-channel of an adjacent master channel, thereby allowing the simultaneous use of these sub-channels within the master channel of the associated master channel. The access points thereby have sub-channels comprising a plurality of subcarriers, each sub-channel suitable for IEEE 802.11a/b/g communications. available at each access point, and the wireless sub-channels are managed by each access point to maximize the sub-channel access, which channel access is statically or dynamically managed depending on traffic requirements.

Figure 5:
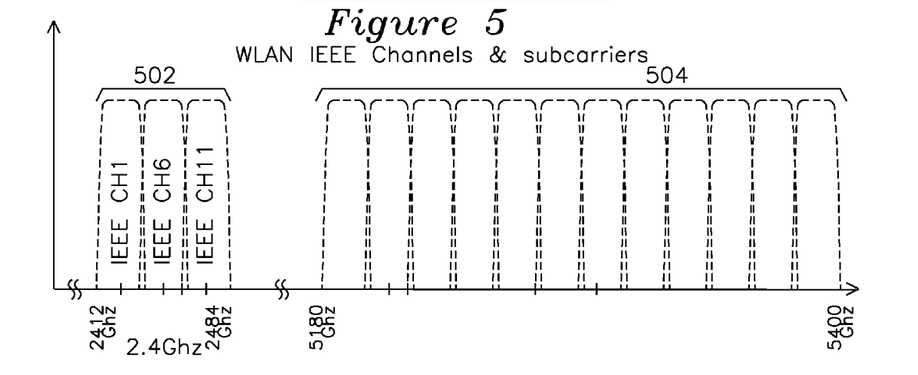
FIG. 5 shows WLAN channels and subcarriers which could be used to form sub-channels of a master channel.

FIG. 5 shows a set of IEEE WLAN channels which could be allocated as sub-channels forming master channels for use by each access point AP1 402, AP2 404, AP3 406, AP4 408, AP5 410, AP6 412, AP7 414, AP8 416. The division of particular frequencies into wireless master channels and thereafter into sub-channels for each master channel may be done in any manner, but for clarity is shown as partitioned using IEEE channel numbers which correspond to specific center frequency and bandwidth as recognized by standards-based WLAN equipment used worldwide. The number of channels required for non-adjacency of a particular sub-channel within a master channel is typically three or four for a planar station configuration, and may alternatively be selected using the well-known "map coloring algorithm" of graph theory.

Figure 6A:
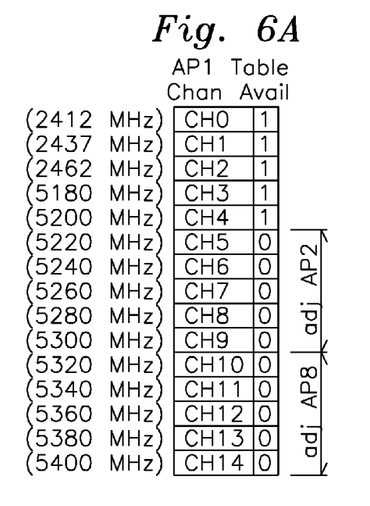
FIGS. 6A, 6B, 6C show tables maintained by each access point.
Figure 6B:
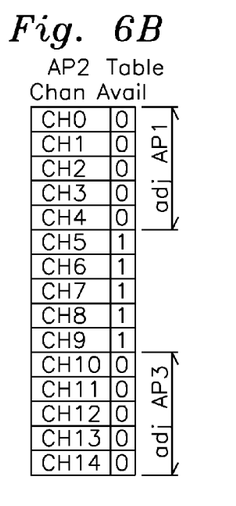
Figure 6C:
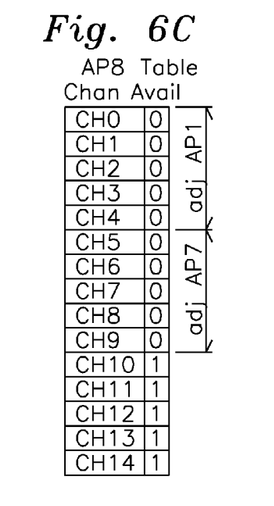

FIGS. 6A, 6B, and 6C shows dynamic table entries maintained by each access point (AP) to indicate the subset of available sub-channels from among all of the possible sub-channels that could be assigned to a particular master channel. In one embodiment of the invention, such as in a setting where a wireless device is issued to a user with a reserved seat and who is seated in a known area of a stadium with a known separation from an AP, the assignments of sub-channels to an STA of the wireless device issued to the user may be static and done in advance based on knowledge of the user is seated. In another embodiment of the invention, the AP advertises availability on certain of its sub-channels based on number of users, network congestion on those sub-channels, or bandwidth considerations.

In the present description of the invention "sub-channel n" is taken to mean a set of subcarriers sufficient for shared media access as previously described for at least one of the IEEE standard protocols 802.11a, 802.11b, 802.11g, or any shared media protocol which operates within a range of frequencies forming a sub-channel separate from other sub-channels, and "channel number" is merely a descriptor in the present invention to distinguish one shared media sub-channel from another, and has no correspondence to the channel numberings used in the IEEE 802.11 family of standards. For example, "IEEE 802.11g channel 6" is defined in the IEEE standard as the 5 Mhz bandwidth which surrounds 2437 Ghz, however in the present invention, channel 0 is the first possible channel, and channel 6 the seventh possible channel.

The sub-channel allocations of a master channel used by a particular access point may be performed manually or statically, or dynamically in any manner by each access point to minimize interference from adjacent access points, but in one embodiment of the invention where each access point is adjacent to another access point on each side, the number of possible frequencies is divided by the number of adjacencies to be shared, with a maximum of four (and more typically three). For example, in the case of FIG. 4, AP1 402 is adjacent to AP2 404 and AP8 416, which creates 3 shared adjacencies, and the number of possible channels is 15, so each access point uses a master channel consisting of 5 sub-channels, as shown in FIG. 6A. Channels 0-4 form a first master channel which is available for use by AP1, and channels 5-9 are indicated as in use by adjacent AP2 on one side, and channels 10-14 are reserved for use by AP8, so the first master channel consists of sub-channels 0-4 in use by AP1. Similarly, for AP2 in FIG. 6B, channels 0-4 are indicated as non-available because of adjacency to AP1, and channels 10-14 are indicated as non-available because of adjacency to AP3, so the second master channel of AP2 consists of sub-channels 5-9 only. FIG. 6C shows the AP8 channel availability table, with channel 0-4 not available (because of adjacency to AP1), channel 5-9 not available (because of adjacency to AP7), and channels 10-14 in use by AP8, resulting in AP8 using a third master channel comprising sub-channels 10-14. In a similar manner, each access point develops a table of channel availability from the possible channels and interfering adjacencies to avoid. As indicated previously, these assignments of sub-channels to a master channel of a particular AP may be done in advance if the topology of the stadium is known, and the assignment of sub-channels to a wireless subscriber device may also be done manually if the user location with respect to a particular AP is known, such as through a reserved seating assignment.

Figures 7, 8A, 8B:
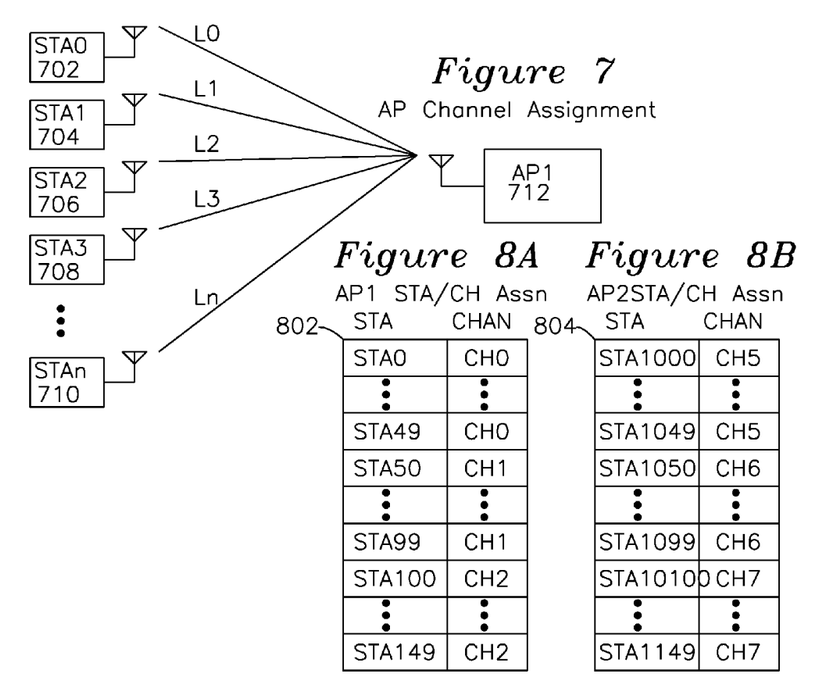
FIG. 7 shows an access point with shared-media wireless links to a plurality of wireless stations served by an access point.
FIG. 8A shows a table of stations and channel assignments maintained by an access point.
FIG. 8B shows a table of stations and channel assignments maintained by a different access point.

For the case where the assignment of an STA to an AP is done dynamically and automatically, FIG. 7 shows AP1 712 such as AP1 402 of FIG. 4, and FIG. 8A shows a second table which is the channel assignment to each station, where the channel assignment is taken from the available channels of FIG. 6A. In one embodiment of the invention, a particular number of stations are allowed on a particular channel, so table 8A shows STA0-STA49 being assigned channel 0, and the 51st station to join STA50 is assigned the next available channel 1. This assignment of channel 1 to new stations associating with AP1 continues until 50 stations on channel 1 are reached, after which channel 2 is advertised by SSID to STA100-149. One mechanism for providing an assignment of stations to channels is by the broadcast of SSID according to availability. For example, AP1 could advertise AP1_SSID_0 initially until 50 associations were completed, and thereafter advertise AP1_SSID_1 until the next 50 stations were associated, continuing in this manner until full utilization were achieved.

In another embodiment of the invention, the allocation of available channels to form master channels having sub-channels for use by the access points is achieved by dynamically allocating more sub-channels to an access point with a larger number of stations or a greater amount of traffic, so as to achieve greater uniformity of loading on each sub-channel, and to provide increased overall bandwidth to the access point which requires it.

In another embodiment of the invention, the association of stations to a particular channel may be revised through an association termination. For example, if there are 50 stations allocated to each of channel 0, channel 1, and channel 2, and four of those stations on channel 0 begin to consume a disproportionate amount of channel bandwidth, those four stations can be moved to other channels through termination of association for those four stations, followed by broadcast by AP1 of AP1_SSID_3 and AP1_SSID_4 for channels 3 and 4, respectively, thereby moving the high demand users to other channels.

Figure 9:
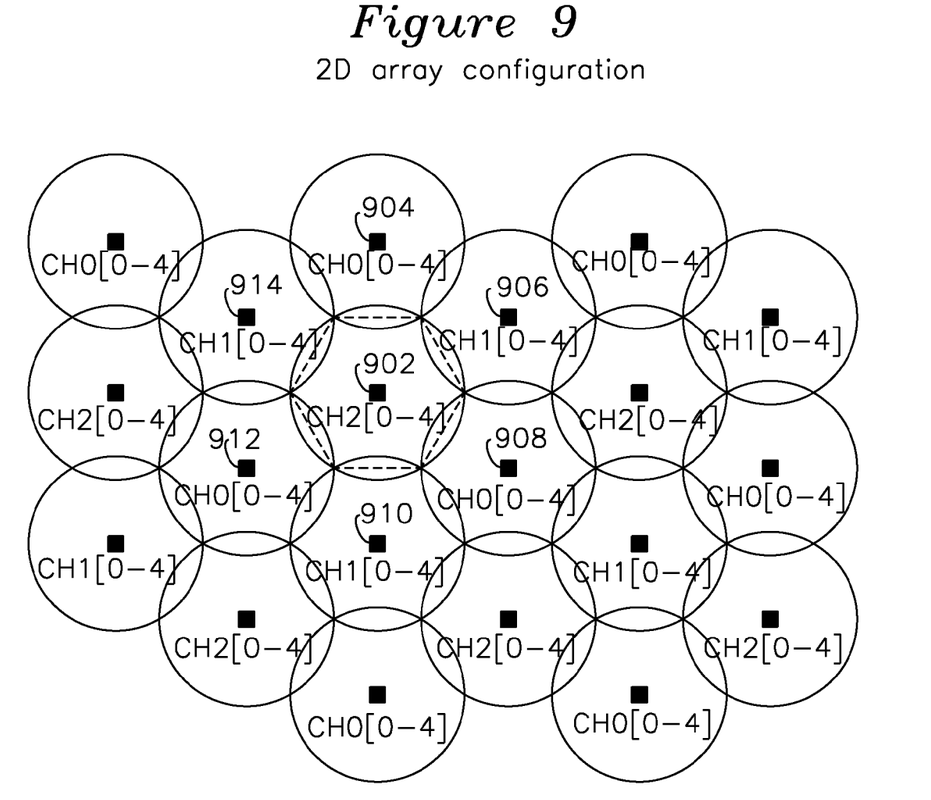
FIG. 9 shows a diagram for a 2 dimensional array of access points with a plurality of channels assigned to each access point.

FIG. 9 shows another embodiment of the invention where the access points are arranged in a hexagonal two dimensional array, with the access point located at the center of each circle indicating range or desired radial extent for stations serviced by the access point. In one example of the invention, there are 15 possible channels available for use, which are allocated to 3 master channels of 5 sub-channels each, with each sub-channel capable of supporting the stations of a particular WLAN without interference or interaction with any of the other 14 sub-channels. This example is shown in the planar configuration of FIG. 9 with a cell 902 (having a dashed line shared boundary) operative on a master channel 2 having 5 sub-channels indicated as [0-4]. Adjacent access points 904, 906, 908, 910, 912, and 914 each operate using a different master channel than access point 902, and each of these access points may assign the sub-channels according to number of stations per sub-channel, or according to the traffic bandwidth requirements of each.

Figure 10:
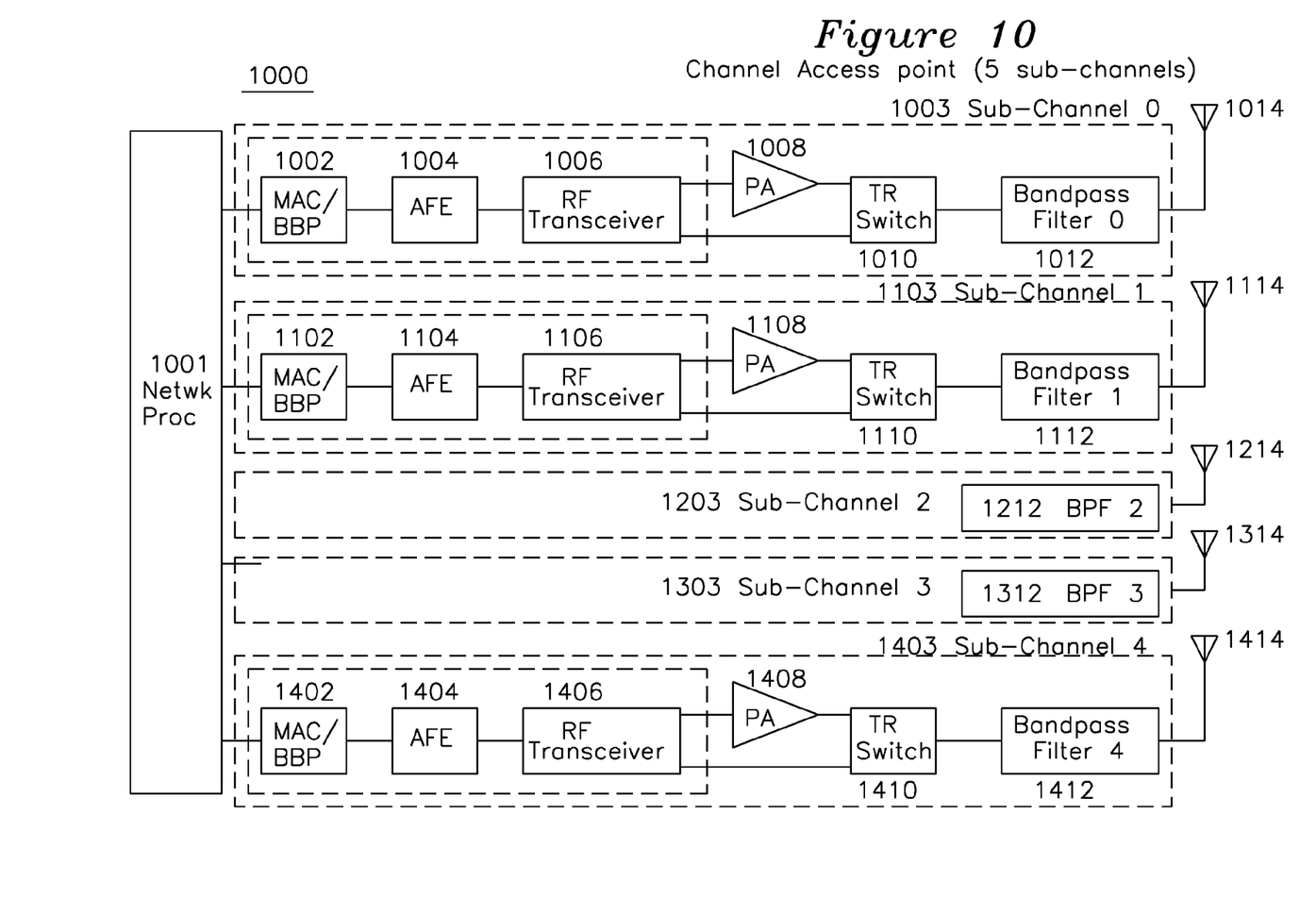
FIG. 10 shows a block diagram for signal processing of an access point according to the present invention.
Figures 11A, 11B:
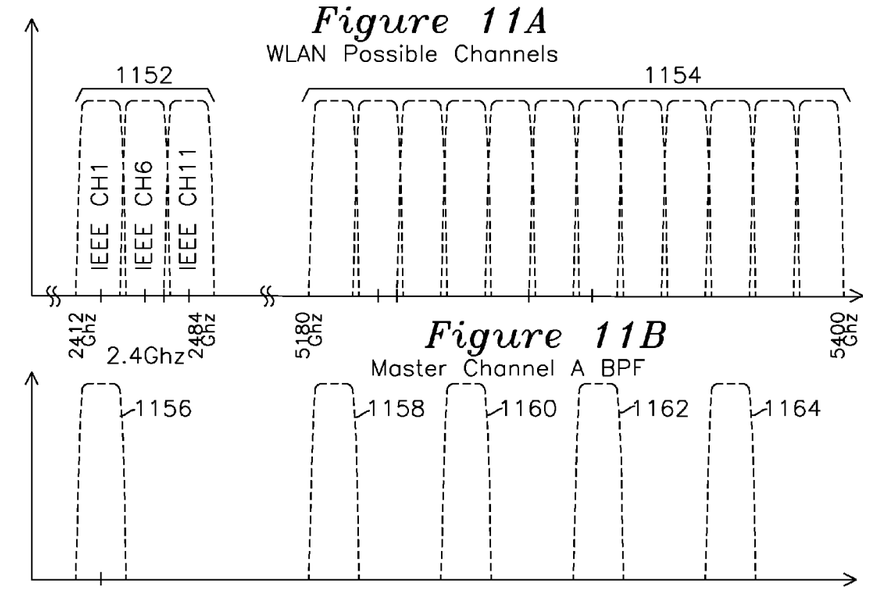
FIGS. 11A, 11B, 11C, and 11D show the bandpass filter characteristic of FIG. 10.
Figure 11C:
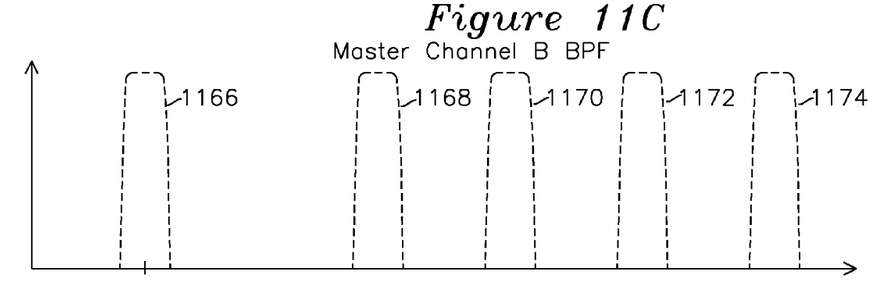
Figure 11D:
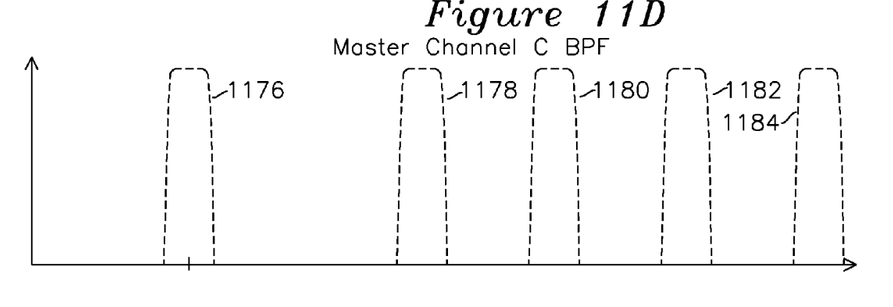

FIG. 10 shows the block diagram for a channel access point 1000 for the case of five sub-channels as was described in previous examples. A network processor 1001 is responsible for the assignment of new stations to particular sub-channels such as by static assignment based on known location information such as a reserved seating information which is available to the wireless STA, or in the automatic configuration case, by broadcasting SSID and advertising sub-channel SSIDs based on number of stations or available bandwidth, as was described previously. The wireless LAN communications of each sub-channel are handled independently of other sub-channels, such as by the signal processing of sub-channel 0 1003, sub-channel 1 1103, sub-channel 2 1203, sub-channel 3 1303, and sub-channel 4 1403, as shown. Each sub-channel within a particular master channel provides independent and simultaneous access to the access points associated with that particular sub-channel. Examining a sub-channel such as sub-channel 0 1003 in detail, baseband processor and media access controller 1002 provides transmit data and accepts receive data with an analog front end 1004 which converts between the digital baseband processing 1002 and the other functional blocks leading to the antenna 1014. Baseband analog transmit signals are mixed to the particular sub-channel frequency by the RF transceiver 1006, with power amplifier 1008 amplifying modulated transmit data, which is coupled through transmit/receive (TR) switch 1010 to bandpass filter 0 1012 and to antenna 1014. Received sub-channel 0 radio frequency information is passed to bandpass filter 1012, to TR switch 1010 which delivers RF to the RF transceiver 1006 which baseband demodulates the RF at the particular sub-channel frequency which matches the center frequency of the associated baseband filter 1012. The analog front end 1004 samples the signals and provides them as digitized signals to the MAC/BBP 1002, which couples them as data to the network processor 1001. The signal processing of each sub-channel 1003, 1103, 1203, 1303, and 1403 are identical to each other with the exception of the transmit and receive mixing frequency of RF transceivers 1006, 1106, 1206, and 1306, and 1406, respectively, and associated bandpass filters 1012, 1112, 1202, 1302, and 1402, respectively, which have characteristics shown in FIG. 11A in composite for lower 2.4 Ghz sub-channels 1102 and upper 5.2 Ghz sub-channels 1104. In one embodiment of the invention, the frequency range assigned to each of the sub-channels of the master channel of an access point 1000 of FIG. 10 is fixed, and the associated frequency characteristics of fixed bandpass filters 1012 1112, . . . , 1412, are matched with the operative range of subcarriers present within each associated sub-channel processor 1003, 1103, 1203, 1303, 1403. In another embodiment of the invention, the bandpass filters are switchable and set to match the AP sub-channels, either through a configuration step, or as part of an automatic discovery protocol operative separately by the AP, as was described previously. For the illustrated case of three master channels, each having 5 sub-channels, the bandpass filters for each master channel are shown in FIGS. 11B, 11C, and 11D. Examining one of the master channels as shown in FIG. 11B (corresponding to the signal processing of FIG. 10), the sub-channel bandpass filter responses are 1156 corresponding to filter 1012 of FIG. 10, filter 1158 corresponding to filter 1112, filter 1160 corresponding to filter 1212, filter 1162 corresponding to bandpass filter 1312, filter 1164 corresponding to bandpass filter 1312, and filter 1164 corresponding to bandpass filter 1412. In this manner, the signal processing of each sub-channel is identical, and the bandpass filters provide the additional required sideband filtering to prevent sidelobes of an adjacent subchannel from this or a different master channel from mixing and interfering or aliasing with the desired sub-channel.

The below table indicates another arrangement of three master channels, each used by an access point which advertises one of BSSID-1, BSSID-2, BSSID-3, and where each of the three master channels is formed using four sub-channels as shown below:

| | Sub-Channel 1 | | Sub-Channel 2 | | Sub-Channel 3 | | Sub-Channel 4 | |
|---|---|---|---|---|---|---|---|---|
| AP SSID | IEEE Channel | Freq. (MHz) | IEEE Channel | Freq. (MHz) | IEEE Channel | Freq. (MHz) | IEEE Channel | Freq. (MHz) |
| BSSID-1 | 1 | 2412 | 36 | 5180 | 60 | 5300 | 104 | 5520 |
| BSSID-2 | 6 | 2437 | 44 | 5220 | 116 | 5580 | 136 | 5680 |
| BSSID-3 | 11 | 2462 | 52 | 5260 | 124 | 5620 | 157 | 5785 |

Figure 12:
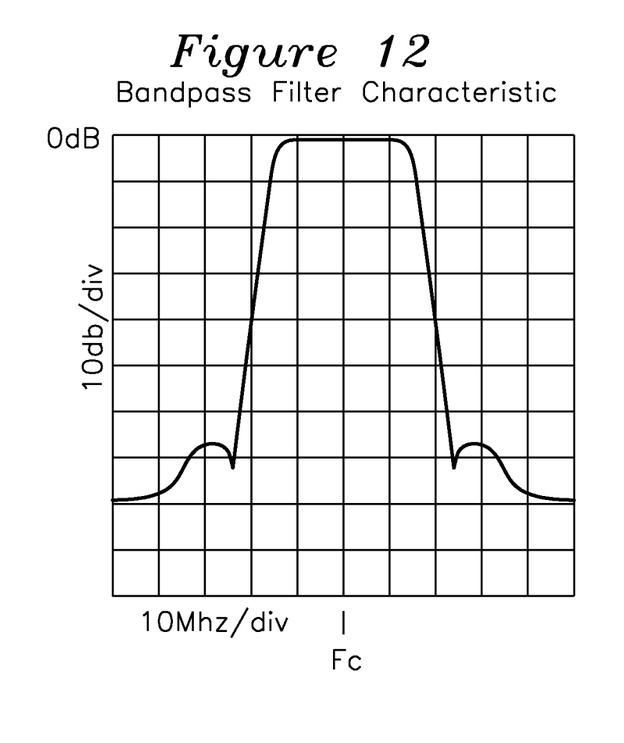
FIG. 12 shows a bandpass frequency characteristic plot.

FIG. 12 shows an exemplar bandpass filter characteristic for use with the IEEE channels described above, with each bandpass filter 1012, 1112, . . . , 1412 of FIG. 10 having a center frequency Fc and the bandwidth shown.

I claim:

1. A communications processor for a wireless LAN operative with a plurality of sub-channels forming a master channel, the communications processor having:
    a network processor;
    a plurality of sub-channel processors, each sub-channel processor having a receive path whereby energy coupled to an antenna for reception of wireless data is directed, in sequence, to a bandpass filter, a transmit/receive switch, an RF transceiver having a mixer and receive local oscillator for down-conversion of received modulated frequencies within frequency limits of said bandpass filter, an analog front end for digitizing of said modulated frequencies to baseband, a baseband processor for formation of said baseband modulated frequencies into demodulated data for transfer to said network processor using a media access controller, the each sub-channel processor also having a transmit path whereby data from said network processor is coupled, in sequence, to said media access controller and to said baseband processor for baseband modulation of said transmit data, said analog front end for digitizing said baseband modulation, said RF transceiver for mixing with a transmit local oscillator to a modulated transmit frequency, thereafter to a power amplifier and said transmit/receive switch, to said bandpass filter and to said antenna;
    said network processor coupled to each of said sub-channel processors, said bandpass filter and said transceiver mixer operative on a unique one of sub-channel frequencies and at least two of said plurality of sub-channel processors simultaneously sending or receiving wireless packets.

2. The communications processor of claim 1 where said communications processor advertises a Service Set IDentifier (SSID) for a particular sub-channel of said master channel until a threshold number of connections is reached on said sub-channel.

3. The communications processor of claim 1 where said communications processor advertises a Service Set IDentifier (SSID) for a particular sub-channel of said master channel until a threshold throughput is reached for said sub-channel.

4. The communications processor of claim 1 where said communications processor advertises a Service Set IDentifier (SSID) for a particular sub-channel of said master channel until an association is made, after which a subsequent SSID advertisement is made for a different sub-channel of said master channel.

5. The communications processor of claim 1 where said communications processor increases or decreases the number of sub-channels in said master channel according to a metric.

6. The communications processor of claim 5 where said metric includes at least one of a bandwidth utilization or a number of associations on said sub-channel.

7. The communications processor of claim 1 where said sub-channels are initially assigned to a particular master channel.

8. The communications processor of claim 1 where each said sub-channel is associated with a list of stations, and an association request from a particular station from said list of stations results in an association with a particular one of said sub-channels according to said list of stations.

9. The communications processor of claim 1 where an association request from a particular station is accepted or refused by said communications processor according to information accompanying said association request.

10. A communications processor for a wireless LAN operative with a plurality of unique sub-channels forming a master channel, each particular unique sub-channel formed from a unique subset of adjacent communication subcarriers within a particular unique range of subcarrier frequencies, each unique subset of adjacent communication subcarriers used exclusively by a particular sub-channel, each sub-channel of said master channel operating independently from any other sub-channel of said master channel, the communications processor having:
    a network processor;
    a plurality of sub-channel processors, each sub-channel processor receiving and transmitting wireless data on an associated said particular sub-channel;
    said network processor coupled to each of said sub-channel processors, each said sub-channel processor receiving and transmitting wireless communications on a unique one of said sub-channels and at least two of said plurality of sub-channel processors simultaneously sending or receiving wireless where said communications processor advertises a Service Set IDentifier (SSID) for a particular one of said sub-channels of said master channel until an association is.

11. The communications processor of claim 10 where said communications processor advertises a Service Set IDentifier (SSID) for a particular one of the sub-channels of said master channel until a threshold number of connections is reached on said sub-channel.

12. The communications processor of claim 10 where said communications processor advertises a Service Set IDentifier (SSID) for a particular one of the sub-channels of said master channel until a threshold throughput is reached for said sub-channel.

13. The communications processor of claim 10 where said communications processor increases or decreases the number of the unique sub-channels in said master channel according to a metric.

14. The communications processor of claim 13 where said metric includes at least one of a bandwidth utilization or a number of associations on said sub-channel.

15. The communications processor of claim 10 where said sub-channels are initially assigned to a particular master channel.

16. The communications processor of claim 10 where each said sub-channel is associated with a list of stations, and an association request from a particular station results in an association with a particular one of said sub-channels according to said list.

17. The communications processor of claim 10 where an association request from a particular station is accepted or refused by said communications processor on the according to information accompanying said association request.

18. A communications processor for a wireless LAN operative on a master channel formed from a plurality of sub-channels, each sub-channel operative on a unique set of adjacent sub-carrier frequencies which are distinct from sub-carrier frequencies of any other sub-channel, the communications processor having:
    a network processor;
    a plurality of sub-channel processors, each said sub-channel processor having a receive path whereby wireless data from a station is coupled to an antenna for reception and is converted into a stream of baseband receive data, said sub-channel processor also coupling a stream of baseband transmit data to an antenna for transmission as wireless data to said station;

said network processor coupled to each of sub-channel processors and operative on one of said unique set of sub-carrier frequencies forming an associated sub-channel, at least two of said plurality of sub-channel processors simultaneously sending or receiving said wireless where said communications processor advertises a Service Set IDentifier (SSID) for a particular one of said sub-channels of said master channel until an association is made, and upon exceeding a threshold number of associations using said particular one of said sub-channels, a subsequent SSID advertisement is made for a different sub-channel of said master channel. made, and upon exceeding a threshold number of associations using said particular one of said sub-channels, a subsequent SSID advertisement is made for a different sub-channel of said master channel.

* * * * *